Figure 1:
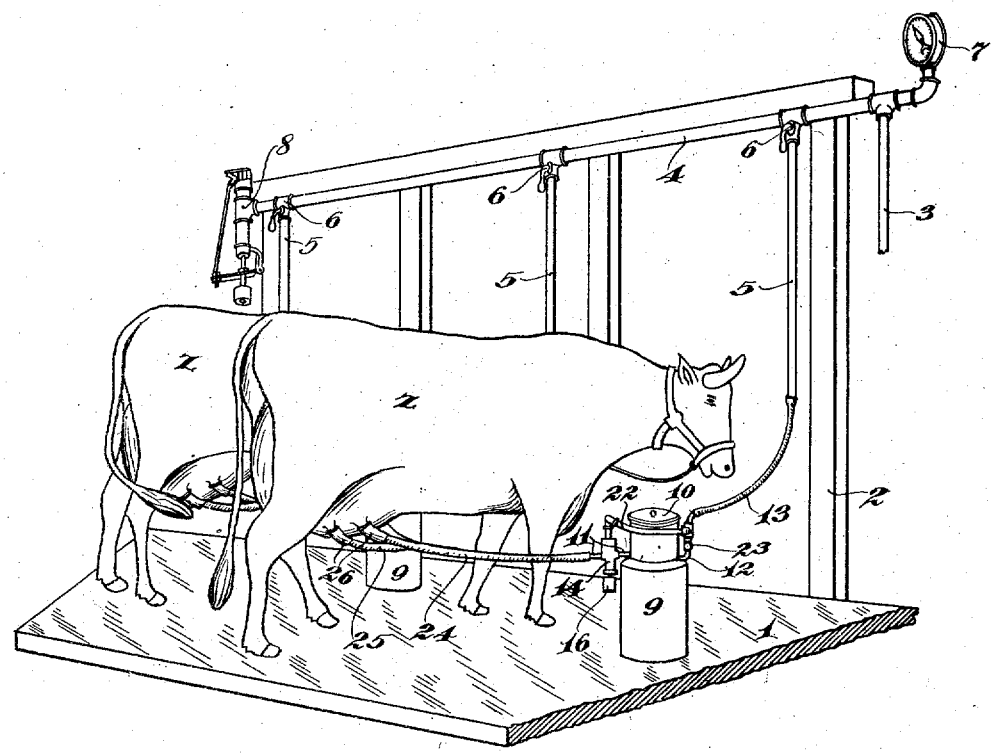

E. E. GOOD.
MILKING APPARATUS.
APPLICATION FILED JUNE 27, 1908.

937,789.

Patented Oct. 26, 1909.
2 SHEETS—SHEET 1.

Witnesses
A. H. Opsahl.
L. L. Simpson

Inventor.
Ezra E. Good
By his Attorneys
Williamson Merchant

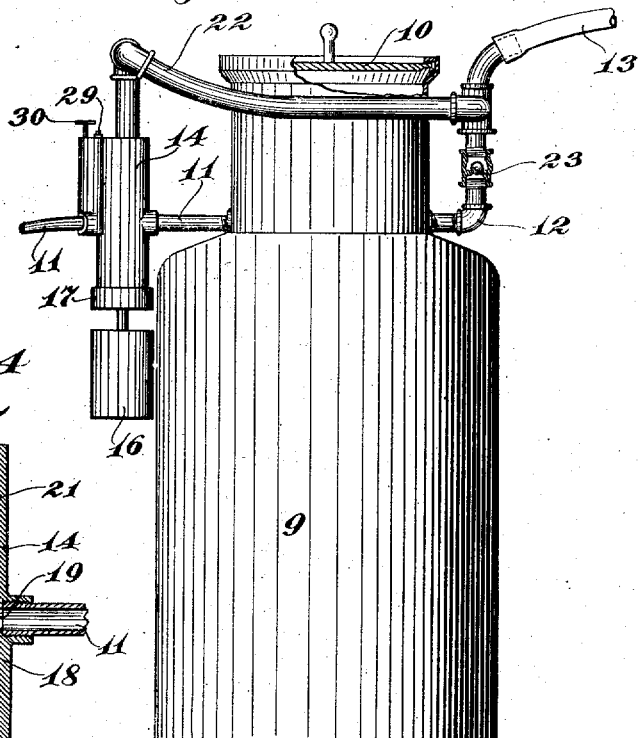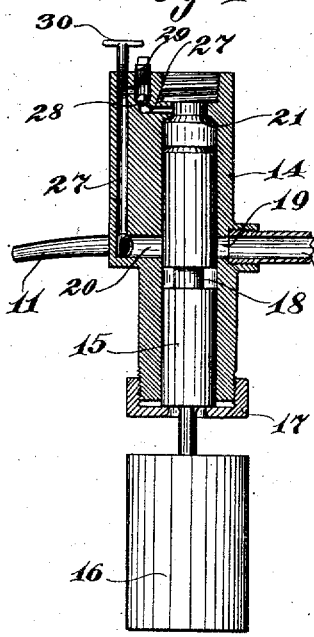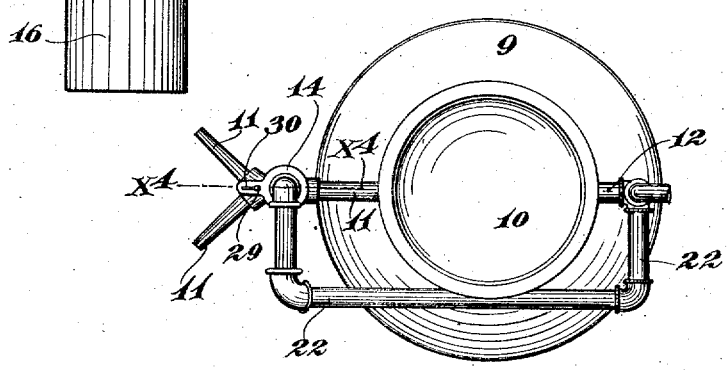

UNITED STATES PATENT OFFICE.

EZRA E. GOOD, OF WATERLOO, IOWA.

MILKING APPARATUS.

937,789.  Specification of Letters Patent.  Patented Oct. 26, 1909.

Application filed June 27, 1908. Serial No. 440,608.

*To all whom it may concern:*

Be it known that I, EZRA E. GOOD, a citizen of the United States, residing at Waterloo, in the county of Blackhawk and State of Iowa, have invented certain new and useful Improvements in Milking Apparatus; and I do hereby declare the following to be a full, clear, and exact description of the invention, such as will enable others skilled in the art to which it appertains to make and use the same.

My invention relates to milking apparatus of the type wherein pulsating devices are employed, and has for its object to provide means for preventing air from entering the can when air is admitted into the system by the pulsating devices for the purpose of relieving the drawing tension on the teat cups.

To the above ends the invention consists of the novel devices and combinations of devices hereinafter described and defined in the claims.

In the accompanying drawings which illustrate the invention, like characters indicate like parts throughout the several views.

Referring to the drawings, Figure 1 is a perspective view showing my present invention applied to a milking apparatus employing a pulsating device of the character disclosed and claimed in my prior patent No. 875,706, issued of date January 7, 1908. Fig. 2 is a detail view in side elevation, with some parts broken away, showing the milk can and the improved connections for preventing air from entering the milk can. Fig. 3 is a plan view of the parts shown in Fig. 2; and Fig. 4 is a detail taken on the line $x^4$ $x^4$ of Fig. 3, showing the parts on a larger scale than in the latter view, and some parts being left in full.

The numeral 1 indicates the floor and the numeral 2 stall posts rigidly secured in the usual or any suitable way. The character z indicates cows within the stalls and which are being milked by the apparatus.

The numeral 3 indicates an air pipe which leads to the air pump, (not shown) by means of which a partial vacuum is produced in the various pipes and tubes of the milking apparatus. At one end, the pipe 3, as shown, leads to a horizontally extended pipe 4 having depending branches 5, of which branches there is one for each stall. As shown, valves 6 are provided in the upper portions of the pipes 5 and by means of which the said pipes may be independently opened and closed.

The numeral 7 indicates a vacuum gage which is in communication with the pipe 4.

The numeral 8 indicates, as an entirety, a pulsating device of the character disclosed and claimed in my prior patent above identified, and which pulsating device, as shown, is connected to the pipe 4.

The numeral 9 indicates a milk can that is provided with a removable cover 10 of the usual or any suitable construction which will make the can approximately air tight, when applied. Each can 9 is provided with a milk inlet pipe 11 and with an air outlet or suction pipe 12, which latter is connected, as shown, by a flexible tube 13, to one of the branch pipes 5. A vertically disposed tubular valve seat 14, preferably in the form of a casting, is interposed in or connected between the sections of the milk pipe 11. Working vertically within the valve seat casting 14 is a cut-off valve 15 of the plunger type, that is normally gravity held in its lowermost position, shown in Fig. 4, by a weight 16; the downward movement of said valve being, as shown, limited by a perforated cap 17 screwed to the lower end of said casting 14. At its intermediate portion this cut-off valve 15 is provided with an annular port 18 that is normally below diametrically opposite ports 19 and 20 formed in the casting 14 at the extremities of the connected milk pipe sections 11. When the cut-off valve 15 is moved upward it strikes against a seat 21 formed in the upper portion of the casting 14, and its port 18 will then register with the ports 19 and 20. The upper extremity of the casting 14 is connected, by a pipe or by-passage 22, to the air suction pipe 12; and the said pipe 12, between the can and the connected end of said by-passage 22, is provided with a gravity seated check valve 23 that freely opens, under suction, to permit air to be drawn from the can 9, but which closes automatically to prevent air from entering the said can through the pipe 12.

To the outer extremity of each milk pipe 11 is connected a flexible milk tube 24 having branches 25 equipped with teat cups 26 of any suitable construction. The said pipe 11 and flexible tube 24 and its branches constitute complete milk conduits or tubes leading into the can, through the valve casting 14 and its ports 19 and 20.

The axial valve seat in the casting 14, at its upper portion, is connected to the outer section of the milk pipe 11, through an air conduit 27 that is normally closed by a gravity seated check valve 28, preferably seated within the said casting 14. The numeral 29 indicates a plug seated in the upper portion of the casting 14 and which, when removed, affords access to the check valve 28. The numeral 30 indicates a regulating valve which, as shown, is screwed into the upper portion of the casting 14, and by means of which the conduit 28 may be contracted or opened up so as to vary the suction on the teat cups. The conduit 27, it will be noted, constitutes part of the complete by-passage that connects the outer section of the milk pipe 11 with a portion of the air pipe 12 just above the check valve 23.

Operation: The operation of the device above described is substantially as follows: When suction is produced in the pipes 3, 4 and 5, the check valve 28 is held closed, while the check valve 23 will freely open, thereby causing the suction or pressure vacuum produced to be effective in the can 9 and through the by-passage 22 on the upper end of the cut-off valve 15, and when this partial vacuum or suction is sufficient to overcome the weight 26, said cut-off valve 15 will be raised so that its port 18 will register with the ports 19 and 20, thereby opening up communication with the can and the milk tubes 24—25 and teat cups 26. This, as is evident, will cause the milk to be drawn through the milk tube or conduit into the can. This drawing action of the milk into the can will continue until air is admitted into the pipes 4 and 5 by action of the pulsating device 8; and when this takes place, the relief from back pressure or suction caused by the admission of air into said pipes 4 and 5 will permit the cut-off valve 15 to be dropped back into its normal position, shown in Fig. 4, thereby closing or cutting off communication between the can and the outer portion of the milk tube or conduit. At the same time the check valve 23 will be closed by an excessive pressure in the pipes 4 and 5 over that in the can 9, and the admitted air will then open the check valve 28 and permit air to flow through the complete by-passage 22—27 into the outer portion of the milk conduit or tube, so as to thereby relieve the teat cups from suction or vacuum drawing action. It will thus be seen that while the pulsations produced by the actions of the air pump and pulsating device are rendered effective upon the teat cups so as to produce the desired milking action, and while under each intermittent drawing action from the pump while the air pipes are closed by the pulsating device, air will be drawn from the can, nevertheless air is positively prevented from reëntering or coming back into the can when the pulsating device permits air to enter the air pipes and outer portion of the milk conduit. To illustrate, in the apparatus disclosed in my said prior patent, each time air is admitted into the system by opening of the valve of the pulsating device, enough air will be admitted into the cans to reduce the vacuum therein an amount approximately equal to that produced in the teat cups; and, under each drawing action of the pump, all air admitted into the cans by a previous opening of the valve of the pulsating device, must be again drawn out before the desired vacuum or suction can be produced in the teat cups and milk tube. In the present apparatus, any vacuum once produced in the milk cans is maintained so that the pump has only to draw sufficient air from the pipes required to produce the suction or vacuum in the milk pipe or teat cups. My present invention, therefore, very greatly increases the efficiency of the apparatus by reducing the amount of air that is admitted to the system to give the relief from suction or vacuum, and which must be again drawn out of the system in order to produce the desired suction or vacuum for the milking action.

By adjustments of the regulating valve 30 the conducting capacity of the by-passage may be varied so as to vary the extent of the action of the pulsations on the teat cups. For instance, when said regulating valve is wide open, the greatest variation in pressure produced by the pulsations will be rendered effective on the teat cups, and when the said valve is adjusted so as to contract the by-passage at the point controlled thereby, the intensity of these pulsations at the teat cups will be very greatly increased.

In the drawings of this application is illustrated what I believe to be the preferred arrangement of the improved device for preventing air from entering the milk can, but I do not limit myself to this specific construction shown, but on the contrary, believe this invention to be generic in its nature and desire to claim the same accordingly. The efficiency of the improved device has been demonstrated in actual practice.

What I claim is:

1. In a milking apparatus, the combination with a can, a milk conduit leading into said can, and an air conduit leading from said can, of an air by-passage provided with a check valve, and connecting said air conduit to said milk conduit independently of the can, and valve mechanisms arranged to permit air to be drawn from said can, and milk to be drawn into said can, but preventing a flow of air into said can.

2. In a milking apparatus of the character described, the combination with a can, a milk conduit leading into said can, and an air conduit leading from said can, of an air by-passage connecting said air conduit to said milk conduit independently of the can and provided with a check valve, a check valve in said air conduit between said can and said by-passage, and a cut-off valve normally closing said milk conduit between said can and said by-passage and arranged to be opened by suction or partial vacuum produced in said by-passage.

3. In a milking apparatus of the character described, the combination with a can, a milk conduit leading into said can, and an air conduit leading from said can, of an air by-passage connecting said air conduit to said milk conduit independently of the can and provided with a check valve, a check valve in said air conduit between said can and said by-passage, a cut-off valve normally closing said milk conduit between said can and said by-passage and arranged to be opened by suction or partial vacuum produced in said by-passage, and a regulating valve in said by-passage.

4. The combination with a milk can provided with an air outlet conduit and a milk inlet conduit, of a valved by-passage connecting said air conduit with said milk conduit independently of said can, a valve in said air pipe between said can and said by-passage, and a cut-off valve normally closing said milk conduit between said can and said by-passage and arranged to be opened by suction or partial vacuum produced in said by-passage.

5. The combination with a milk can provided with an air outlet conduit and a milk inlet conduit, of a valved by-passage connecting said air conduit to said milk conduit independently of the can, a check valve in said air conduit between said can and said by-passage, a valve seat casting connected in said milk conduit and through which a portion of said by-passage is extended, and a gravity seated cut-off valve of the plunger type seated in said casting, normally closing said milk conduit between said can and said by-passage, the upper portion of said valve being subject to vacuum or suction from said by-passage.

In testimony whereof I affix my signature in presence of two witnesses.

EZRA E. GOOD.

Witnesses:
W. J. McGORREY,
F. E. STEWART.